Dec. 12, 1967    R. THIRION    3,357,526
DRUM BRAKE
Filed April 19, 1965    4 Sheets-Sheet 1
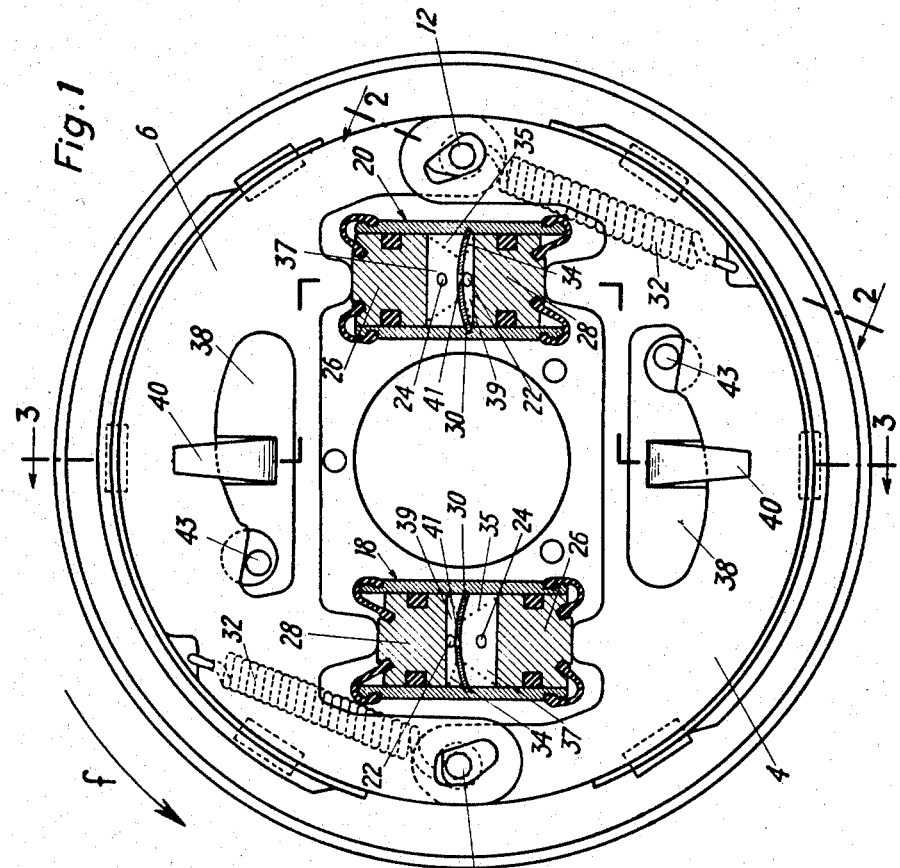
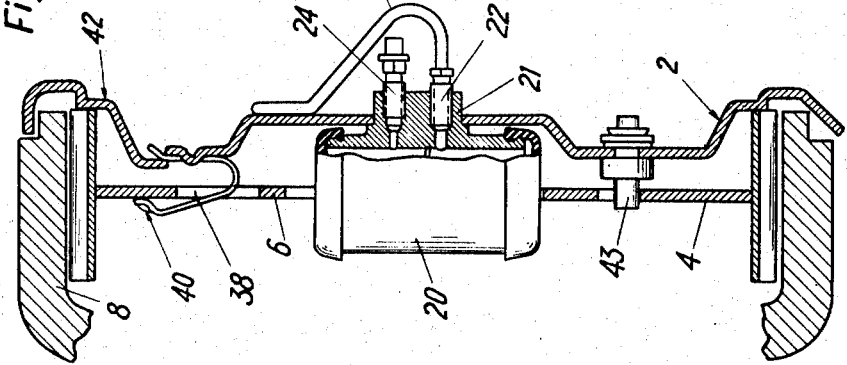

Dec. 12, 1967   R. THIRION   3,357,526
DRUM BRAKE
Filed April 19, 1965   4 Sheets-Sheet 2
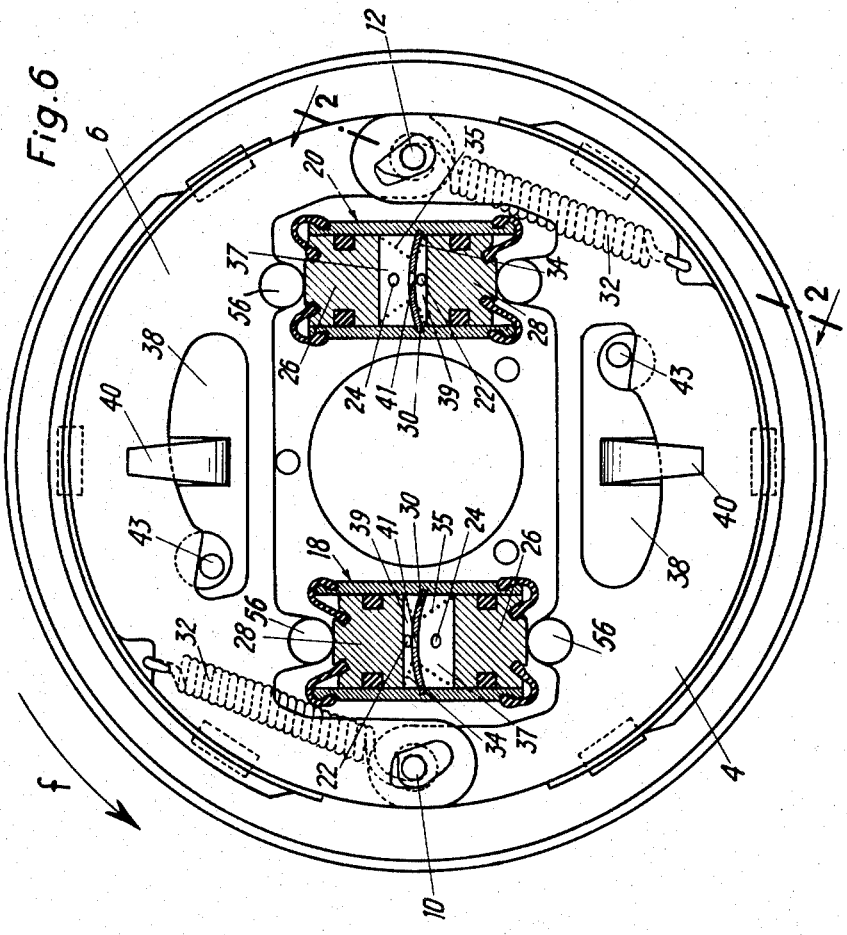
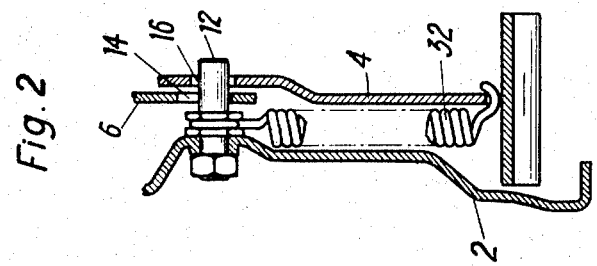

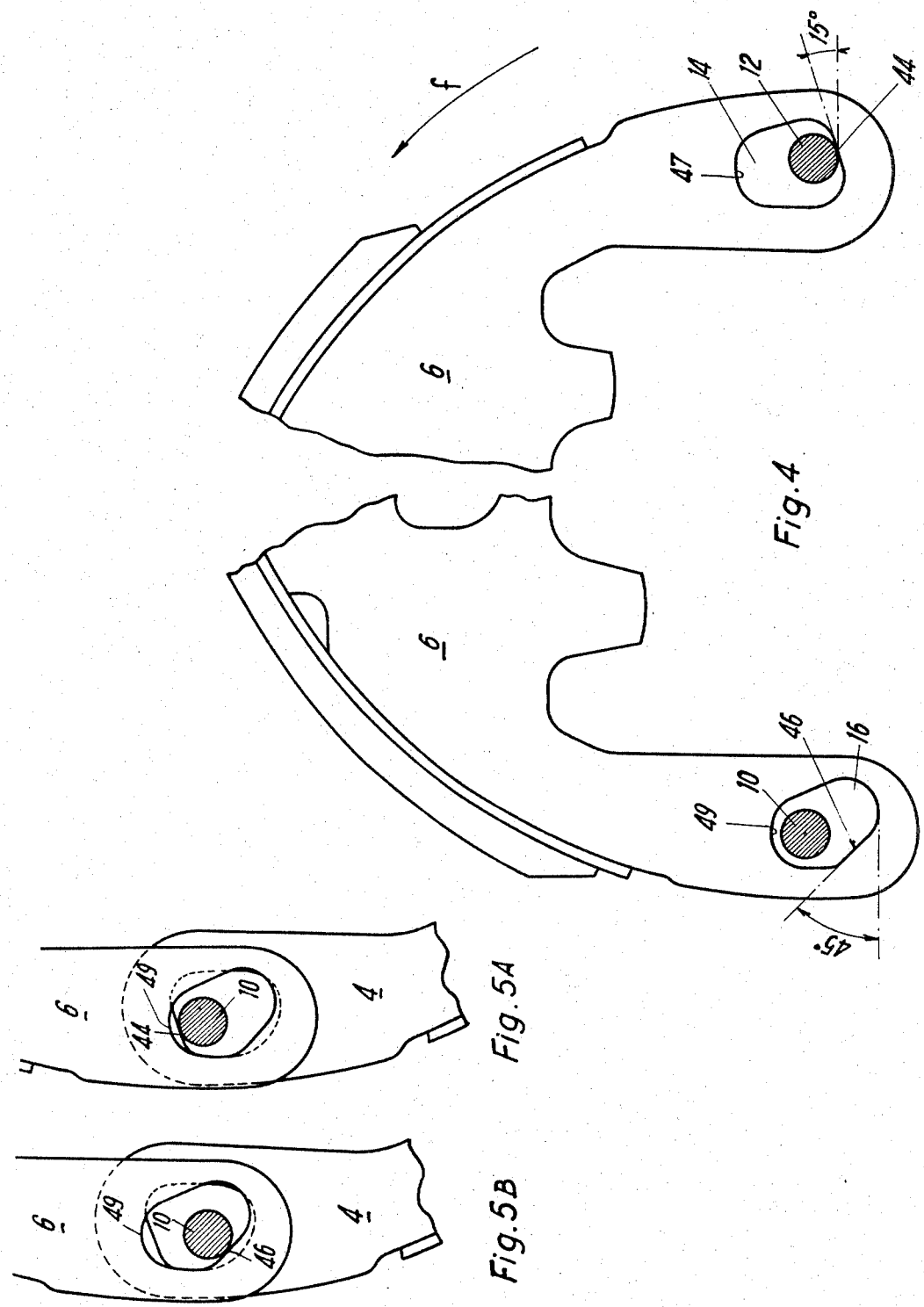

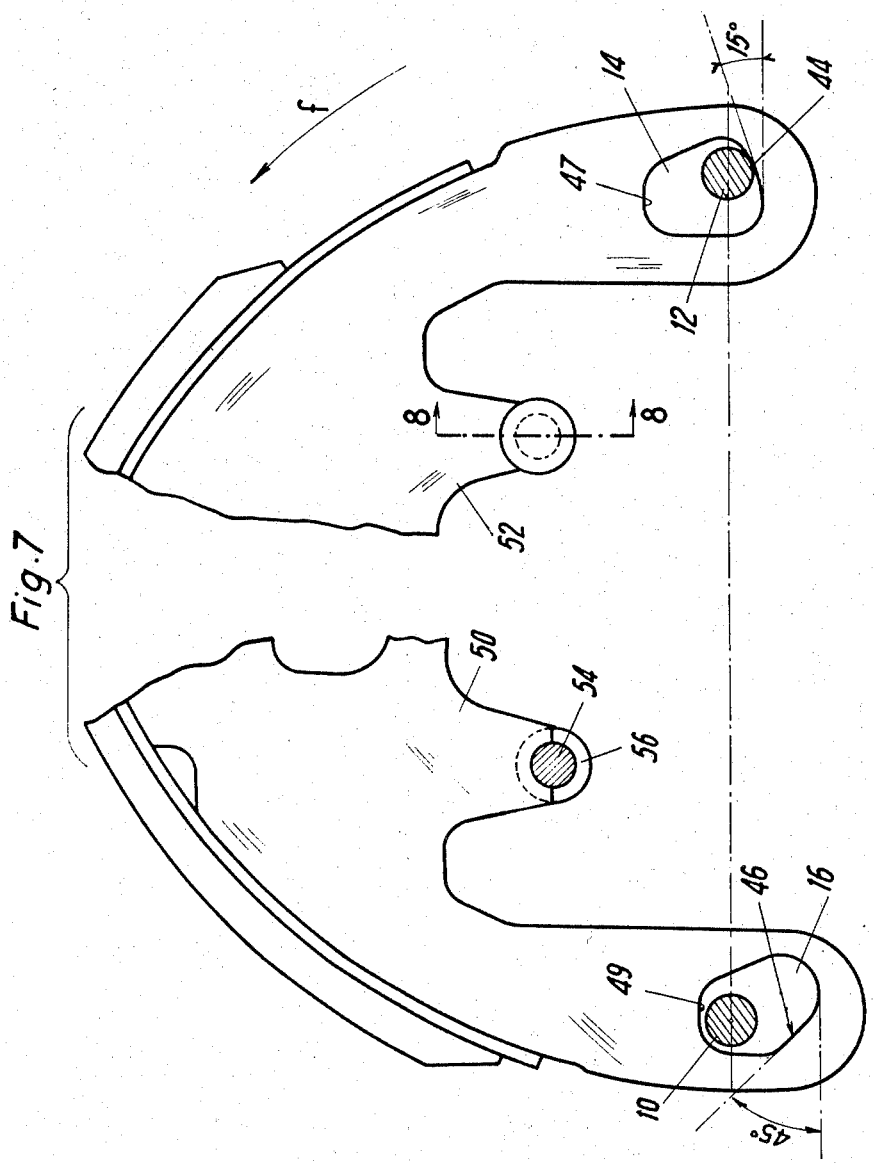
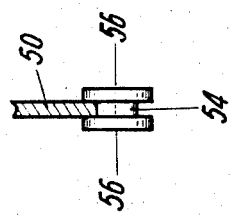

3,357,526
DRUM BRAKE
René Thirion, Paris, France, assignor to Societe Anonyme
D.B.A., Paris, France, a company of France
Filed Apr. 19, 1965, Ser. No. 449,229
Claims priority, application France, Apr. 20, 1964,
971,604; Mar. 26, 1965, 10,964
9 Claims. (Cl. 188—78)

The present invention relates to drum brakes comprising a pair of shoes provided to operate as trailing shoes in either direction of drum rotation. By the term trailing shoes are designated the shoes submitted to driving force from the drum in a direction such that this force acts opposite to the action of the brake applying device and tends to disengage the shoes from the drum. Trailing shoe drum brakes have been put in operation because of the stability of the braking torque which is independent from the variation of the friction coefficient under the effect of a rise in temperature occuring during the braking operation.

In the prior art structures, the anchoring pins constituted the pivoting axis of the shoes which had only one degree of freedom. This imposed upon the elements of the assembly the requirement that they be geometrically accurate, since otherwise eccentricities of the shoes would occur with the result that the lining would not operate along its whole periphery.

An object of the present invention is to provide a brake comprising trailing shoes arranged in a floating manner, said brake being characterized in that the trailing shoes are adapted to slide with respect to the anchoring pin and thus to fit the friction surface of the drum. In other words, the trailing shoes are given two degrees of freedom permitting their pivoting in a plane which is parallel to the plane of the fixed support while permitting also a floating motion of the pivoting point.

According to the invention, there is used the principle of directed reaction by giving to the ramp constituting the element through the intermediary of which the shoes take support upon the anchoring pin, an angle calculated to provide a symmetrical repartition of the pressures upon the friction surface of the linings, the angle between the ramp and the radius passing through the centre of the anchor pin being preferably of about 15°.

According to a feature of the invention, the trailing shoes are so arranged that during forward braking the respective shoes are abutting the anchor pins which avoids the tilting of the shoes when the linings engage the drum, this improvement resulting in the suppression of a noise and wear generating jerk. The brake being in the released position, there is provided a small clearance between the opposed anchor pins and the slots provided at the opposite ends of the shoes, this clearance increasing when adjustments are made to compensate for the wear of the linings.

According to another feature of the invention, the slot which is provided at the end of the shoes to take abutment onto the anchor pin during the rearward braking and which is shorter than the slot provided at the opposite end of the shoe in order to avoid the undesired actuation of the brake as a leading shoe brake, comprises an inclined ramp which forms an angle of about 45° with the radius passing through the centre of the anchoring pin to permit a sloped engagement of the shoes with the anchor pins and thus a damping of the jerk occurring upon the tilting of the shoes upon initiation of braking in the rearward direction.

The invention has also for its object hydraulic means for damping the tilting which occurs upon initiation of braking in the rearward direction when the shoes are caused to change their anchoring pins. These hydraulic means advantageously consist of a dome-shaped disc provided with a central orifice designed to restrict the passage of the liquid which is moved by the piston when the shoe takes abutment onto the anchor pin during the rearward braking. The dome-shaped discs are located in the cylinders with their convexity directed upwardly with a view to facilitating the purging operation.

According to still another object of the invention, two springs, one for each shoe, are fixed on the one hand to the anchoring pin and on the other hand to the shoe substantially near the end comprising the slot used as abutment slot in the rearward braking. These two springs are provided to urge the shoes onto the adjustment eccentrics and onto the abutment faces of the slots when the brake is released and also during forward braking.

In the brakes of the aforementioned type, the webs of the shoes are provided with two lugs adapted to engage the pistons of a pair of hydraulically controlled cylinders arranged in the vicinity of the anchoring pins. During the rearward braking, as soon as the linings engage the drum, the shoes are tilted about the axis of the drum causing them to change their anchoring. During this tilting movement, the lug engaging one of the pistons tends to move away therefrom whereas the second lug acts inwardly upon the other piston. It is necessary that the value of the outward stroke of the first piston be identical to the value of the inward stroke of the second piston since otherwise the operation of the brake should be defective. In fact, if the strokes of the outwardly urged pistons were larger than the strokes of the pistons urged inwardly, the increased volume given to the liquid contained in the cylinders in which the pistons are moving would result in an undesired depression on the brake pedal. The inverse phenomenon would result in a reduction of the volume to the liquid contained in the cylinder causing a violent braking in the rearward direction.

Consequently, the two lugs of each shoe are asymmetrically arranged. In other terms they have different lengths, which are calculated in such a manner that at the beginning of the tilting, the position of an outgoing piston is symmetrical with respect to the median plane of the two cylinders, to the position after tilting of the ingoing piston and vice versa.

The operation of the brake will remain correct during the whole life thereof on condition that the shape of the lugs remain perfect from a geometrical point of view. However, it is known that a certain crushing of the lugs appears, resulting in the formation of flat surfaces. It results therefrom that during the tilting the stroke of the ingoing piston becomes larger than the stroke of the outgoing piston which tends to produce after certain number of brake applications, a violent braking in the rearward direction.

According to the invention, to obviate such a drawback there has been provided, between the aforementioned lugs and the corresponding pistons, pairs of rollers located on either side of the respective lugs to cooperate with the bearing surface provided on the respective piston.

According to the invention, the said lugs are provided with semi-circular slots constituting recesses receiving the shaft of pairs of twin-arranged rollers located on either side of said lugs to cooperate with bearing surfaces provided on the pistons.

One of the advantages resulting from the construction described is the possibility of using rollers having a radius which is smaller than the radius of the corresponding bearing surface of the lugs for the obtention of similar unitary pressures since the length of the bearing surface is thus multiplied by two. Consequently, the surface swept by the rollers is reduced and is better located on the useful surface of the wheel cylinders. It results therefrom that the areas along which the rollers bear upon the pistons when maximum forces are transmitted can be set nearer to the axes of the pistons thanks to the use of the rollers.

Furthemore, the rollers may roll and slide on the bearing surfaces provided on the pistons which permits a reduction of the friction forces and thence of the wear. Finally the rollers may be made of a metal or of an alloy having an appropriate hardness and conveniently treated which also permits reducing the wear. All these improvements resulting in a reduction of the wear permit avoiding a disequilibrium of the displacements of the pistons during the life duration of the vehicle.

Other features and advantages of the invention will appear in the following description with reference to the annexed drawings, in which:

FIG. 1 is a diagrammatic view of a drum brake according to the invention the parts of which have been shown, the brake being in the released condition.

FIG. 2 is a cross-section along line 2—2 of FIG. 1.

FIG. 3 is a cross-section along line 3—3 of FIG. 1 showing the arrangement of the piping between cylinders as well as the purging screw.

FIG. 4, partly broken away, a shoe the ends of which comprise slots cooperating with their respective anchor pins.

FIG. 5A shows the position of the overlapping ends of two brake shoes when the linings engage the drum.

FIG. 5B, similar to FIG. 5A, corresponds to a rearward braking condition obtained after tilting of the two brake shoes.

FIG. 6 is a diagrammatic view of another embodiment of the invention similar to the embodiment of FIGS. 1 to 5 but in which the shoes are connected to the pistons provided in the respective cylinders by the intermediary of pairs of rollers cooperating with bearing surfaces provided on said pistons.

FIG. 7 shows one of the shoes comprising asymmetrical lugs each provided with a pair of rollers.

FIG. 8 is a cross-section along line 8—8 of FIG. 7 showing the mounting of a pair of rollers at the end of the respective lug.

The drum brake shown on FIGS. 1, 2 and 3 comprises a backing plate 2 rigidly secured to a fixed element such as a hub 4, 6 adapted to be frictionally brought into engagement with a rotating drum 8. On backing plate 2 are mounted two anchoring pins 10 and 12 each passing through registering slots 14 and 16 in shoes 6 and 4 respectively (as shown in FIG. 2).

The drum brake is actuated by wheel cylinders 18 and 20 secured to backing plate 2. Each of said cylinders comprises a boss 21 extending through a hole provided in backing plate 2. In boss 21 are provided a passage 22 and a passage 24. Passages 22 of the cylinders 18 and 20 are connected one to the other by means of a piping 36 located at the outside of the brake (the tubing shown in FIG. 3 is not presented in FIG. 1).

Passage 24 of cylinder 18 is connected by means of a piping (not shown) to a master cylinder or to the hydraulic cylinder of a servo-brake. Passage 24 of cylinder 20 is closed by a purging screw. Passage 22 opens into chamber 39 of the wheel cylinder and passage 24 opens into chamber 37 of the wheel cylinder.

Each cylinder comprises a pair of pistons 26 and 28. A dome-shaped disc 30 provided with a central orifice 31 defines in the cylinder the two-above mentioned chambers 37 and 39. The disc 30 has its convex face which is directed upwardly to facilitate the purging operation of the cylinder.

A biasing spring 32 connects each anchor pin to the outlet end of the respective shoe corresponding to the forward braking.

The pistons are located in the cylinders in different positions. Each piston 28 is urged toward the interior of the cylinder by the respective spring 32 thus compressing a conical helical spring 34 located between the dome-shaped disc 30 and said piston whereas piston 26 located on the other side of disc 30 is urged toward the interior by a smaller value against the action of a conical helical spring 35. It should be noted that the chamber 37 adjacent to piston 26 has a volume which is larger than the one of the chamber 39 because of the asymmetry of the lugs of the shoes. It results therefrom that on the one hand a sufficient stroke is left to the pistons 28 which causes the pivoting of the shoes when in the forward direction and, on the other hand, a clearance between piston 26 and disc 30 which will permit a sufficient re-entry of piston 26 during the tilting of the shoes corresponding to the initiation of the braking in rearward direction as will be explained hereafter.

The chambers 39 adjacent pistons 28 which urge the shoes toward the drum are large displacement chambers. These chambers are directly connected one to the other by means of piping 36 located at the outside of the backing plate thus permitting a simultaneous application of the two shoes against the drum. The lateral positioning of the shoes with respect to the fixed support 2 is obtained by means of flat springs 40 affixed upon the fixed support which are bent so as to be provided with branches passing through openings 38 cut in the web of the respective shoes to cooperate with the face of said web which is at the opposite side with respect to said fixed support. With such an arrangement the ribs of the shoes are urged in abutment against a stamped portion 42 of the fixed support forming backing plate. The positioning of the shoes is set by means of adjustment eccentrics 43 cooperating with the edges of openings 38.

As shown in FIG. 4, the shoes are provided at their respective ends with slots 14 and 16 of different configuration and the anchoring pins 10 and 12 extend through said slots arranged in registering position. The webs of the shoes are arranged in the median plane of the cylinders and the end of one of said shoes (in this case shoe 4) connected to the anchoring pin is shifted with respect to the median plane of such shoes as shown in FIG. 2.

Slots 14 and 16 comprise ramps 44 and 46 by means of which is obtained a floating arrangement of the shoes with respect to the anchoring pins which permits a translation movement of the shoes so that they are adapted to fit the inner contour of the drum while being adapted to pivot about the respective anchoring pins. The aforesaid ramps are of different inclinations so that they may perform the following functions: ramp 44 which is in engagement with anchor pin 12 in the brake released position of FIG. 4 and FIG. 5A is at an angle of about 15° with respect to the line connecting the centres of the two axes of the anchoring pins when the linings are new and in close contact with the drum in the case of forward braking, so that the resultant of the drum reactions onto the shoes passes through the center of curvature of the lining. Ramp 46 provided on the edge of the slot 16 is made with an inclination of about 45° with respect to the same axis so that during a change in the anchoring position of the shoes upon initiation of braking in a rearward direction, said ramp 46 acts as a guiding surface for the respective shoe and prevents the latter from jerking against the anchoring pin passing through said slot.

The ramp 49 of slot 16 located in front of ramp 46 has to be disposed in such a manner that the shoe (say shoe 6) be adapted to engage simultaneously the anchoring pin 12 by the ramp 44 of slot 14 and the adjustment eccentric 43 under the action of spring 32. Consequently, this ramp 49 has to be located sufficiently away from anchor pin 10, when the brake is in the released condition, so that any engagement between ramp 49 and anchoring pin 10 be avoided. In effect, such an engagement would prevent ramp 44 from bearing on anchoring pin 12 and would result in the generation of a clearance between said ramp 44 and said anchor pin 12 causing an engagement upon initiation of braking in rearward direction.

The ramp 46 of slot 16 has to be sufficiently remote from anchor pin 10 not to be brought into engagement with said anchor pin 10 during the forward braking even if the linings are completely worn, since an engagement would cause the stopping of the shoes (say shoe 6) having for its result the impossibility of applying the brakes.

Slot 16 being thus defined, the edge 47 of slot 14 located substantially opposite to ramp 44 will now be described. It is necessary that during the tilting motion of the shoe occurring when the lining thereof is brought into engagement with the drum during the rearward braking, said shoe takes support upon the anchoring pin 10 by means of ramp 46 thereby precluding the anchoring on pin 12 by means of edge 47 of slot 14 which would result in the operation of said shoe as a leading shoe thus generating excessive stresses which the brake has not been designed to sustain.

The brake described hereinabove operates as follows:

The brake being in the released condition, the shoes are urged by springs 32 to engage, on the one hand the anchoring pins through the intermediary of their ramps 44 and, on the other hand, the adjustment eccentrics 43.

During the forward braking, i.e. when the drum is rotated as indicated by arrow f, pressure liquid is admitted through passage 24 into the small stroke chamber 37 of cylinder 18. The liquid thus enters chamber 39 through orifice 41 provided in the centre of the dome-shaped disc 30 and then flows through piping 36 to chamber 34 of cylinder 20 and therefrom through orifice 41 thereof into chamber 37 of said cylinder 20.

The fluid pressure in the cylinders 18 and 20 acts to move pistons 26 and 28 of said cylinders thus causing the shoes to be pivoted through the intermediary of the ramps 44 of their slots 14 about their respective anchoring pins. The linings are then brought into engagement with the drum which rotates in a direction such that the shoes are kept in abutment on their anchoring pins by means of their ramps 44 (as shown in FIG. 5A). The shoes tend to disengage the drum and act as trailing shoes. The shoes are arranged in a floating manner on their respective anchoring pins and are adapted to slide with respect to the latter through the intermediary of the ramps 44 thus fitting the friction surface of the drum. The inclinations of the ramps 44 of slots 14 have been so chosen that the radial component of the drum reactions against the linings of the shoes coincides with the axis of symmetry of said lining. Thus are obtained the best conditions of operation of the brake.

The clearance between the shoes and the drum is readjusted by means of the eccentrics 43 resulting in a self-centering because of the displacement of the abutment ramps 44 against the respective anchoring pins.

Upon initiation of the braking in the rearward direction, the shoes are moved in the same manner as in the case of the braking in forward direction and this until the moment when the linings engage the drum. At this moment under the driving effect exerted by the drum, the shoes are pivoted around the axis of the drum and their slots 16 travel above along a path which brings them to take support by means of their ramps 46 upon the anchoring pins (the registering slots are then located with respect to the anchoring pin as shown in FIG. 5B). Similarly to the case of the braking in the forward direction the shoes then operate, as already explained, as trailing shoes and any possibility of their action as leading shoes is precluded by the fact that in the beginning of the tilting, the distance between ramp 46 and the corresponding anchoring pin 10 is less than the distance separating the face 47 of the opposite slot 14 of the corresponding anchoring pin 12.

It is to be noted that the value of the tilting of the shoes decreases simultaneously with the wear of the linings thus reducing furthermore the risk of operating the shoes as leading shoes during the braking in rearward direction because of the reduction of the distance between ramp 46 and the respective anchoring pin, the distance between face 47 and the corresponding anchoring pin being maintained unchanged.

It is also to be noted that the tilting action is a violent action which would generate strong impacts. The inclination of ramp 46 is designed to avoid the jerk of said ramp on the anchoring pin. Furthermore, during the tilting motion, piston 28 moves out of its bore whereas piston 26 moves into its bore. The liquid flows from one chamber to the other through the restricted orifice 41 provided in the dome-shaped disc 30 resulting in a throttling of the liquid causing the damping of impact during the tilting movement of the brake shoes. When the actuation of the brakes in the rearward direction is suspended, the shoes are returned to their released position under the biasing action of springs 32. During this return movement, the liquid is repelled in reverse direction through the throttling orifice 41 which results in a damping of the return movement and the suppression of the impact as well as of the noise which would result therefrom.

In the embodiment shown in FIGS. 6, 7 and 8 which is similar to the embodiment that has been described hereinabove, the same parts have been designated by the same reference numerals as above. In the present embodiment, as already described, the respective shoes are provided with lugs 50–52 having different lengths. Along the end edge of said lugs is provided a semi-circular groove forming a bearing for the shaft 54 integral with rollers 56 disposed on both sides of the above-mentioned lugs. Said rollers are made of steel having a convenient hardness and having been conveniently heat treated. The use of such rollers permits at least doubling the contact zone with the bearing surface provided on the piston. It is even possible to increase more than twice the value of this contact zone by the use of rollers having a thickness which is superior to the one of the sheet of metal used to manufacture the webs of the shoes. The main advantage of such a structure however is that it permits using rollers having a small radius instead of lugs comprising a contact surface having a large radius. It results therefrom that the surface swept by the rollers 56 is better inscribed in the interior of the surface allowed in the wheel cylinders and it is thus possible to have the piston axis closer to the impact area of the rollers upon said piston when the rollers are transmitting the maximum efforts. The embodiment shown in FIGS. 6 to 8 operates in the same manner as the embodiment described before. Upon initiation of braking in the rearward direction as soon as the linings engage with the drum, the tilting of the shoes occurs about the axis of the drum thus causing the ramps to reverse their abutment position on the respective anchoring pins. Thus ramp 46 will travel along a relatively short distance separating it from the anchoring pin 10 on which said ramp will be brought into sloped engagement thus damping the resulting impingement whereas ramp 44 will disengage anchoring pin 12 and will provide a sufficient clearance between face 47 and said anchoring pin because of the larger length of the slot 14 when compared to slot 16. During this tilting movement of the shoes, first lug 50 cooperating with piston 28 tends to move away from the latter whereas the second lug 52 tends to push piston 26 inwardly into the relevant cylinder. It is necessary that the outward displacement of piston 28 be identical to the inward displacement of piston 26 since otherwise, as already explained hereinabove, the operation of the brake would be faulty. To this end, the two lugs are asymmetrically arranged with a view to causing the two displacements to be identical; in other words with a view to obtain that the position of the outgoing piston 28, at the beginning of the tilting caused upon initiation of the braking in the rearward direction, be symmetrical with respect to the median plane of the two cylinders to the position which will occupy the ingoing piston 26 after the tilting has been completed. The above conditions are only fulfilled if the diametral position of the shoes remains perfect but experience has taught that because of the crushing of the ends of the lugs the stroke of the ingoing piston during the tilting becomes superior to the stroke of the outgoing piston which tends to produce after a certain number of applications of the brakes a violent braking in the rearward direction. The use of the rollers 56 permits avoiding such a drawback during the whole life of the vehicle comprising the brakes of the invention.

What is claimed is:

1. A brake including a rotatable drum, a fixed support, a pair of anchor pins carried on opposite sides of the fixed support; a pair of brake shoes each having adjacent the ends thereof of a pair of elongated slots having a width substantially greater than the width of said pins, said slots being arranged to register with said anchor pins so that the anchor pins may extend therethrough; a pair of fluid pressure cylinders each operatively connected to each of the brake shoes adjacent the ends thereof; a ramp provided on each of said slots which is inclined with respect to a plane passing through said pair of anchor pins; spring means operatively connecting with the outlet end of each brake shoe, which outlet end is the end opposite the first shoe end located in the direction of drum rotation, whereby upon pressurization of said cylinders, as the drum is rotating, the outlet end of said shoe is carried by the drum into abutment with the respective anchor pin through the intermediary of said ramp, while the entry end of said shoe, which is the opposite shoe end with respect to said outlet end, is abutting the other anchor pin so as to be pivotable and capable of lateral movement thereabout, said brake shoes being mounted to said support so as to inverse their position with respect to said anchor pins when the drum is rotating in an opposite direction than aforementioned, and said brake shoes are also arranged on said support so as to shift the abutment of the outlet end of the brake shoes on said ramp transversely to the respective anchor pin.

2. A brake including a rotatable drum, a fixed support, a pair of anchor pins carried by the fixed support, a pair of brake shoes provided at each outlet and entry end thereof with slots having overlapping portions through which projects the respective anchor pins said slots being of greater width than said pins to permit lateral movement of said brake shoes, said shoes each having lugs of different lengths intermediate the outlet and entry end thereof, a pair of cylinders secured to the fixed support and including a pair of pistons, said cylinders being located with respect to the anchor pins in such a manner that said pistons are different distances from a plane passing through said pins when in abutment with said lugs so that the pressurization of said cylinders creates a force exerted at the outlet end of said shoes bringing them into contact with the rotating drum adjacent one anchor pin, ramps enabling shifting of abutment of said shoes on the respective anchor pins whereby said shoes are adapted to operate as trailing shoes in either direction of rotation, the ramp on the slot at the one of the said portions being inclined with respect to the drum reaction, to direct the latter substantially through the center of curvature of the brake shoes lining, and the ramp on the slot of the other of said portions being inclined with respect to a plane passing through the pair of anchor pins to damp the engagement of said brake shoe with said anchor pin upon braking in a rearward direction.

3. A brake including a rotatable drum; a fixed support plate; a pair of anchor pins secured to said support plate; a pair of brake shoes each formed at the adjacent ends thereof with a pair of slots arranged so that said brake shoes may be mounted to said anchor pins with said anchor pins extending through said slots with clearance between the side edges of said slots and said anchor pins; a ramp formed on each of said slots and inclined with respect to a plane passing through both said anchor pins; a pair of cylinders secured to said support plate radially inwardly of said anchor pins; a pair of pistons located in each cylinder and operatively connected to the respective brake shoes; a positioning stop located between the respective brake shoe ends; a return spring means connecting the brake shoes to the anchor pins to thereby urge the brake shoes to bias one of said pistons in each of said cylinders inwardly thereof, and permit the other of said pistons in each of said cylinders to assume an outward position with respect to said cylinder; said operative connection of said brake shoes to said pair of pistons in each of said cylinders being by asymmetrical lugs formed on the brake shoes and corresponding to the respective positions of said pistons in the respective cylinders and the respective ramp in the slot at one of the brake shoe ends and enabling the shifting of said one of said brake shoe ends transversely to the respective anchor pin during braking in one direction with the damping of the engagement of the other opposite brake shoe ends with respect to its anchor pin upon braking in another direction.

4. A brake according to claim 3, characterized in that the lugs are connected to the pistons through the intermediary of a pair of rollers interconnected by a pin located in a semi-circular recess formed in the respective lugs whereby the position of one roller set when the brake shoes come into engagement with the drum is symmetrical to the position taken by the other roller set following the tilting of the shoes occurring at the start of braking in rearward direction.

5. A brake according to claim 4 in which the ramp acting as abutment for the shoe end urged against the anchor pin during braking in forward direction forms with the drum radius passing through the abutment point an angle which confers to the resultant of the drum reactions onto the shoes a direction which passes through the center of curvature of the lining, said angle preferably being of about 15°.

6. A brake according to claim 4 in which the ramp acting as abutment for the shoe end urged against the anchor pins during braking in rearward direction forms with the drum radius passing through the abutment point an angle which provides a sloped engagement of the shoes with the anchor pins and thus damps the jerk occuring upon tilting of the shoes as they come into engagement with the drum when the brake is actuated in rearward direction, said angle preferably being of about 45°.

7. A brake according to claim 4 characterized by a return spring connecting each shoe to the anchor pin located near the outlet shoe end opposite to the shoe end on which said brake shoe takes support in forward braking, said spring being arranged to urge the edge of an opening formed in said shoe into engagement with an adjustment eccentric mounted on the backing plate, and to provide a clearance between the slot formed at the said outlet end and the said anchor pin, the value of said clearance being adapted to increase as the said eccentrics are actuated to take up the wear, said springs conferring different rest positions to the pistons in said cylinders.

8. A brake according to claim 3 and further comprising a throttling disc secured within each of the pair of cylinders substantially at the middle of the length thereof which due to the unequal positions of said pistons within said cylinder as caused by said brake shoes creates two fluid pressure operated chambers of unequal volume within said cylinder, said throttling disc having a restricted passageway therethrough connecting the chambers, and a means to admit fluid under pressure into the larger volume chamber of one of said cylinders and into the lesser volume chamber of the other of said cylinders to actuate said pair of pistons located in each cylinder.

9. A brake according to claim 8 wherein the said throttling disc is shaped as a dome having the apex thereof directed upwardly.

References Cited

UNITED STATES PATENTS

| | | | |
|---|---|---|---|
| 1,705,855 | 3/1929 | Dodge | 188—78 |
| 2,074,434 | 3/1937 | Schnell | 188—78 X |
| 2,781,868 | 2/1957 | House | 188—78 |

FOREIGN PATENTS 941,352　11/1963　Great Britain.

MILTON BUCHLER, *Primary Examiner.*

B. S. MOWRY, T. W. BUCKMAN, *Assistant Examiners.*